United States Patent [19]
Gold

[11] Patent Number: 5,429,858
[45] Date of Patent: Jul. 4, 1995

[54] CORRUGATED RETAINER AND SPACER FOR GLASS PANELS AND METHOD FOR APPLYING SAME

[76] Inventor: Peter Gold, 465 N. Wood Rd., Rockville Centre, N.Y. 11570

[21] Appl. No.: 206,840

[22] Filed: Mar. 7, 1994

[51] Int. Cl.$^6$ .............................. B32B 3/28; B60J 1/00
[52] U.S. Cl. .................................... 428/182; 428/137; 428/352; 428/354; 296/96.21; 156/107; 156/108; 52/783.18; 52/785.12
[58] Field of Search ................... 428/34, 131, 182, 40, 428/76, 120, 137, 128, 153, 154, 192, 352, 354, 537.5; 156/107, 109, 108, 99, 205; 52/788, 790, 795, 800; 296/84.1, 96.21

[56] References Cited
U.S. PATENT DOCUMENTS
1,988,964  1/1935  Barrows ........................ 428/182

*Primary Examiner*—Donald J. Loney
*Attorney, Agent, or Firm*—Galgano & Burke

[57] ABSTRACT

A corrugated paper retainer and adjustable spacer for adhesively applying a glass panel to a support surface, especially an automotive body panel defining a window opening, which includes a corrugated paper retainer assembly composed of a top ply having an adhesive-covered top surface, a bottom ply having an adhesive-covered bottom surface, and a crushable corrugated intermediate ply sandwiched and bonded between the top and bottom plies. The bottom ply is bondable to the support surface via the adhesive covered bottom surface thereof and the top surface is bondable to the glass panel via the adhesive bonded top surface thereof. The retainer assembly is variably compressible via its crushable corrugated ply to adjust the spaced distance of the glass panel with respect to the support surface. A method of installing a glass panel is also disclosed.

7 Claims, 2 Drawing Sheets

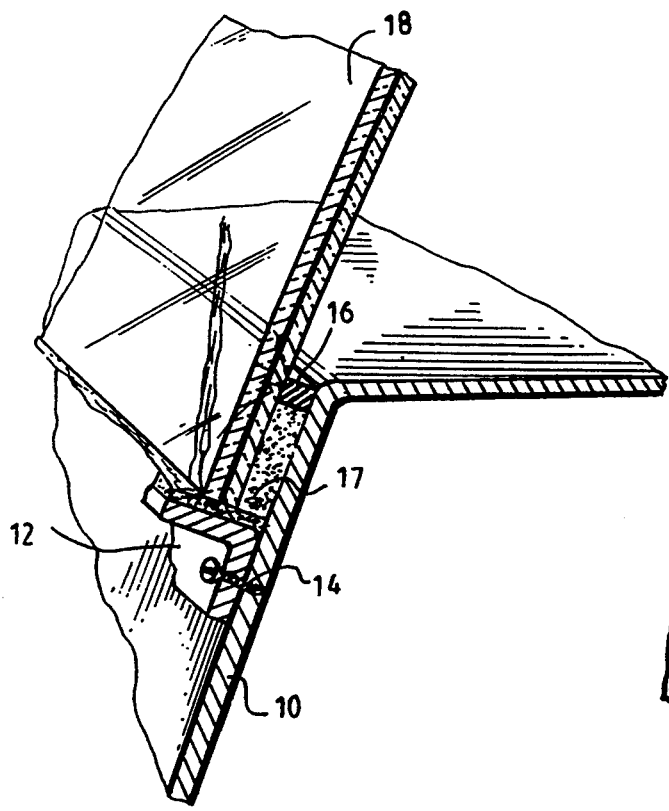
Fig. 1 (PRIOR ART)
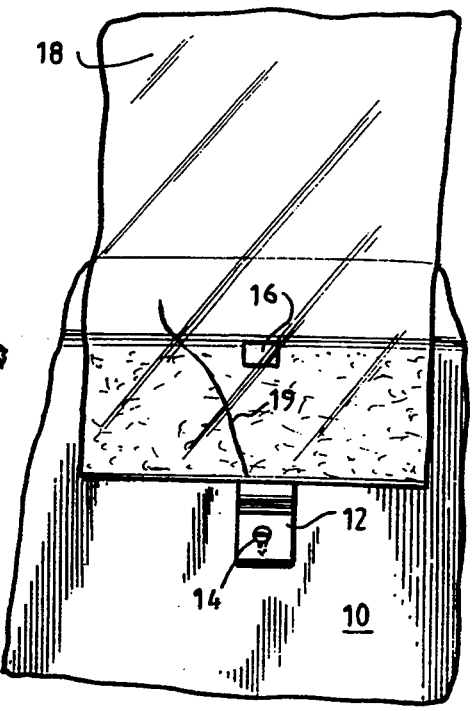
Fig. 2 (PRIOR ART)
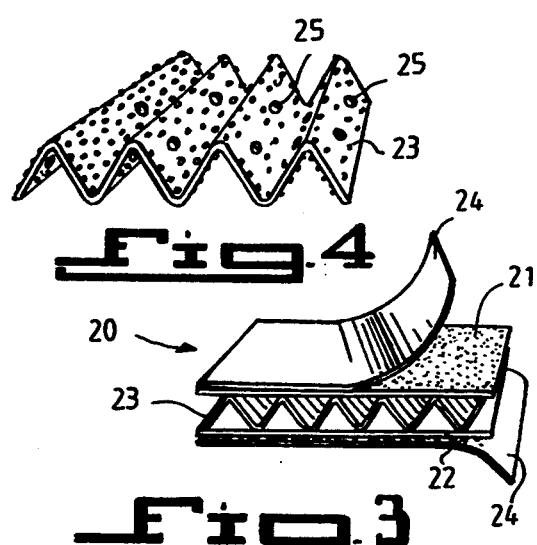
Fig. 4
Fig. 3
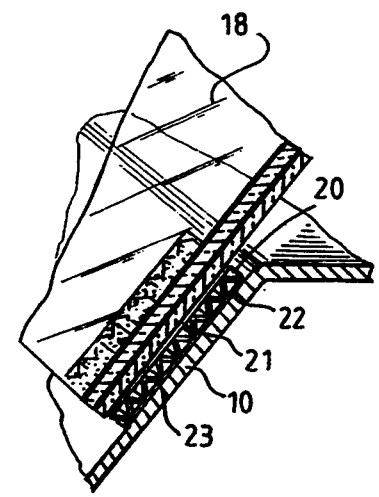
Fig. 5

CORRUGATED RETAINER AND SPACER FOR GLASS PANELS AND METHOD FOR APPLYING SAME

BACKGROUND OF THE INVENTION

The present invention relates to a corrugated paper retainer and adjustable spacer for adhesively applied glass panels and a novel method for applying glass panels employing the same. More particularly, it relates to such a corrugated paper retainer or setting stop which is especially intended for automotive glass windows.

A variety of devices are now being used to retain and/or space adhesively applied glass panels to body panel openings of motor vehicles. One example of the conventional devices now being used is shown in FIGS. 1 and 2 of the drawings. Therein illustrated is an automotive inverted L-shaped body panel 10 which defines the front windshield opening of an automobile. One or more reversely disposed, L-shaped brackets or retainers 12 are affixed to the body panel via a screw 14 and are used to support the edge of the glass windshield. One or more rubber spacers 16 are used to space the laminated glass windshield 18 at the desired distance away from body panel 10 to provide a flush mounting of the glass windshield relative to the window opening defined by the body panel. Adhesive 17, typically a curable polyurethane adhesive, is applied between the glass panel 18 and the body panel 10 which, upon curing, permanently bonds the glass windshield 18 to the body panel 10.

According to the prior art techniques, the rubber spacers must be sized to provide the desired applicable spaced distance for the addition of uncured adhesive between the glass panel and the body panel. These spacers are made of plastic or rubber and a multiplicity of them are placed in position around the peripheral edge side of the window opening defining flange of the body panel. These spacers are generally applied by hand on a manufacturers assembly line.

As can be appreciated, the application of the various retainer brackets 12 to the body panel and the positioning of the spacers 16 is both time consuming, inefficient, labor intensive and costly. Moreover, because there is relatively little give in the rubber spacers and the retainers, and since they are manually applied together with the auto glass panel, there is a significant risk that if the spacers are not positioned properly or too much pressure is applied to the glass, that the glass will develop a stress fracture 19.

In particular, the urethane adhesive typically pulls the glass inward via contraction of the adhesive during curing causing opposing frictional contact and pressure of the edge of the glass windshield with the setting stop resulting in a crack in the laminated glass. Moreover, torsional vibration and/or shock loads are transmitted directly by the non-resilient setting stops to the glass which can also result in fracture of the glass.

SUMMARY OF THE INVENTION

Accordingly, it is an object of the present invention to provide a novel combination corrugated paper retainer and adjustable spacer for adhesively applied glass panels, especially automotive glass panels, which eliminates the need of separate spacers and retainers employing screws for proper glass positioning, thereby also eliminating the need for adding holes into the vehicle.

It is a further object of the present invention to provide such a novel adjustable spacer and retainer which affords far less resistance to back pressure when integrating the glass panel into the adhesive, thereby preventing concentrated pressures causing the glass to crack during torsional and vibrational loads during the vehicle's operation.

It is yet another object of the present invention to provide such an adjustable combination setting/spacer that can be adjusted after the glass has been applied onto the vehicle.

It is yet a further object of the present invention to provide such an adjustable combination setting/spacer that can adjust to variations of the body panel and variations of the flange wall of the body panel facing the edge of the auto glass to thereby eliminate the need for expensive reaction injection molded frames for auto glass windows.

It is still a further object of the present invention to provide such a novel setting stop and retainer that can be made from renewable resources.

It is a more particular object of the present invention to provide a novel method for applying glass panels to a body panel utilizing a novel adjustable combination setting stop and spacer according to the present invention.

Certain of the foregoing and related objects are readily attained in a corrugated paper retainer and adjustable spacer for adhesively applying a glass panel to a support surface which comprises a corrugated paper retainer assembly including a top ply having an adhesive-covered top surface, a bottom ply having an adhesive-covered bottom surface, and a crushable corrugated intermediate ply sandwiched and bonded between the top and bottom plies. The bottom ply is bondable to the support surface via the adhesive covered bottom surface thereof and the top surface is bondable to the glass panel via the adhesive bonded top surface thereof. The retainer assembly is variably compressible via its crushable corrugated ply to adjust the spaced distance of the glass panel with respect to the support surface.

Preferably, the retainer assembly additionally includes top and bottom release plies normally covering the adhesive-coated top and bottom plies. Most advantageously, the corrugated ply is adhesively-coated and the corrugated ply has holes formed therethrough, and the assembly is made of corrugated paperboard.

Certain of the foregoing and related objects are also attained in a method for installing a glass panel to a support surface which comprises the initial steps of providing a compressible corrugated paper retainer assembly including a top ply having an adhesive-covered top surface, a bottom ply having an adhesive-covered bottom surface, and a crushable corrugated intermediate ply sandwiched and bonded between said top and bottom plies. Then the bottom ply is adhesively bonded to a support surface via its adhesive covered bottom surface thereof and the glass panel is applied to the top surface of the corrugated paper retainer assembly via its adhesive covered top surface thereof. Following application, the glass panel is then pressed toward the support surface until it is at a predetermined desired distance therefrom, the retainer assembly being variably compressible via its crushable corrugated ply to adjust to the desired spaced distance of the glass panel with respect to the support surface. Adhesive is applied between the glass panel and the support surface to effect permanent bonding of the glass panel to said support surface, the retainer and spacer assembly supporting the glass panel in the desired position until the adhesive cures.

Most desirably, the corrugated paper retainer assembly has holes formed in the corrugated ply and the adhesive is applied into the corrugated ply and through the holes thereof to provide a mechanical interlock. Most advantageously, the glass panel is an automotive glass panel and the support surface is an automotive body panel which defines a window opening.

BRIEF DESCRIPTION OF THE DRAWINGS

These and other objects and advantages of the present invention will become apparent from the following description of the accompanying drawings which discloses one embodiment of the present invention. It is to be understood that the drawing is to be used for the purpose of illustration only and not as a definition of the invention.

In the drawings, wherein similar reference numerals denote similar elements throughout the several views:

FIG. 1 is a perspective view showing the prior art technique for applying a glass panel to an automotive body panel;

FIG. 2 is a front elevational view of the prior art assembly as shown in FIG. 1;

FIG. 3 is an enlarged perspective view of the novel corrugated paper retainer and adjustable spacer embodying the present invention;

FIG. 4 is an enlarged perspective view of the corrugated ply of the retainer;

FIG. 5 is a perspective view showing the retainer being used to apply a glass windshield to a body panel opening.

DETAILED DESCRIPTION OF THE PREFERRED EMBODIMENT

Figure 6:
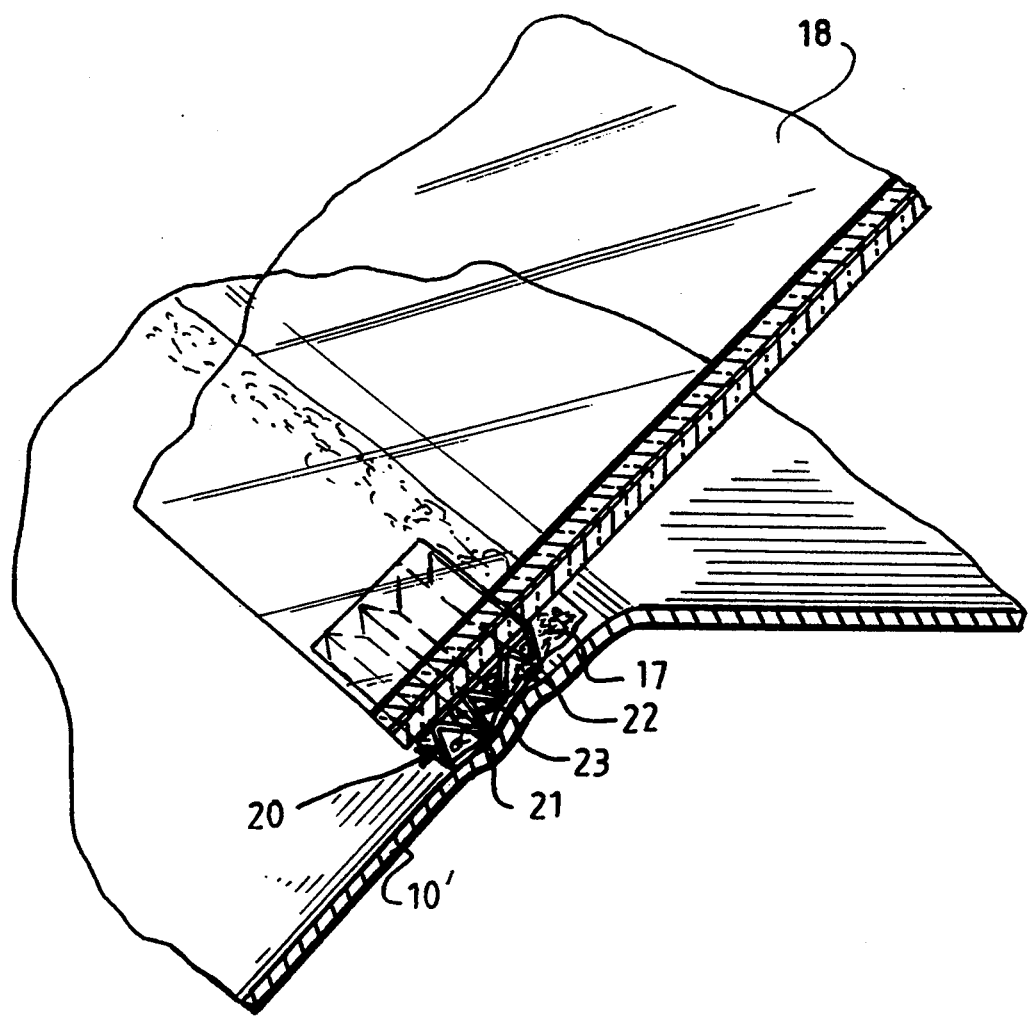
FIG. 6 is a perspective view similar to that of FIG. 5 but showing the retainer of the present invention being slightly compressed to adjust to an irregular surface in the body panel opening to assist in the proper spacing of the glass panel with respect thereto.

Turning now in detail to the appended drawings and, as previously discussed, FIGS. 1 and 2 represent the prior art. FIG. 3 thereof illustrates the novel corrugated paper retainer and adjustable spacer for adhesively applying a glass panel to an automotive body panel opening embodying the present invention generally designated by reference numeral 20 which consists of a top ply 21 having an adhesively covered top surface, a bottom ply 22 having an adhesively covered bottom surface, and a crushable corrugated intermediate ply 23 sandwiched and bonded between the top and bottom plies 21, 22. The bottom ply 22 is covered with a release sheet or ply 24, and the top surface of the top ply is also covered with a release ply 24 so that the adhesive-coated top and bottom plies are normally covered prior to use of the retainer 20. As shown in FIG. 4, the intermediate ply 23 is preferably adhesively covered and is provided with holes 25, the purpose of which will be described in greater detail hereinafter.

FIG. 5 illustrates the application of the novel retainer 20 to a body panel 10 for, in turn, supporting a laminated front windshield 18. Initially, the bottom release strip 24 would be removed from the bottom ply 22 of the retainer 20, and the retainer 20 would be applied to the body panel 10 in the desired location by bonding the bottom ply 22 via its adhesive coating to the body panel 10. Then, the release strip 24 covering the top surface of the top ply 21 would be removed and the glass windshield 18 would be applied and adhesively bonded thereto via its adhesive coating in its desired position. If the distance between the glass panel 18 and the body panel 10 is not correct, the windshield can be pressed downward to provide a more closer fit via the compressible retainer 20 and, in particular, its crushable corrugated intermediate ply 23.

This is perhaps best illustrated in FIG. 6 which shows an irregular body panel 10' to which the retainer 20 is initially applied. As can be seen therein, the retainer 20 will adjust via variable compression thereof and, in particular, intermediate ply 23 to provide the proper distance between the glass panel and the body panel.

Following, or prior to glass application, curable adhesive 17, e.g., polyurethane, is applied between the glass 18 and body panel 10, 10'. When the adhesive 17 is applied, it can also be injected into the corrugated ply 23 and into the holes 25 extending through the corrugated ply to provide a more permanent locking of the windshield 18 to the body panel 10, 10'. It should also be noted that the retainer 20 can either be continuous or in discrete sections.

As can be appreciated, the inventive retainer 20 has significant utilitarian advantages over the prior art. In particular, the present invention affords the ability to use the same spacing device used in the transport of auto glass panels from the auto glass manufacturer to the vehicle manufacturers assembly line, or to customers in the automotive glass replacement business, i.e., paperboard or card board, thereby allowing the estimated recycling of over two hundred and fifty million square feet of corrugated paper a year in the transport of auto glass.

Accordingly, while only one embodiment of the present invention has been shown and described, it is to be understood that many changes and modifications may be made thereunto without departing from the spirit and scope of the invention as disclosed herein.

What is claimed is:

1. A corrugated paper retainer and adjustable spacer for adhesively applying an automotive glass panel to an automotive metal body panel defining a window opening and having a support surface comprising:

a corrugated paper retainer assembly including a top ply having an adhesive-covered top surface, a bottom ply having an adhesive-covered bottom surface, and a crushable corrugated intermediate ply sandwiched and bonded between said top and bottom plies, said bottom ply being bondable to the support surface via said adhesive covered bottom surface thereof and said top surface being bondable to the glass panel via said adhesive bonded top surface thereof, said retainer assembly being variably compressible via its crushable corrugated ply to adjust the spaced distance of the glass panel with respect to the support surface so that the glass panel will lie in its proper position relative to said body panel.

2. The retainer and spacer of claim 1, wherein said retainer assembly additionally includes top and bottom release plies normally covering said adhesive-coated top and bottom plies.

3. The retainer and spacer of claim 1, wherein said corrugated ply is adhesively-coated.

4. The retainer and spacer of claim 1, wherein said corrugated ply has holes formed therethrough.

5. The retainer and spacer of claim 1, wherein said assembly is made of corrugated paperboard.

6. A method for installing an automotive glass panel on a recessed support surface of an automotive metal body panel defining a window opening comprising the steps of:

providing a compressible corrugated paper retainer assembly including a top ply having an adhesive-covered top surface, a bottom ply having an adhesive-covered bottom surface, and a crushable corrugated intermediate ply sandwiched and bonded between said top and bottom plies;

adhesively bonding said bottom ply to a support surface via said adhesive covered bottom surface thereof;

applying said glass panel to said top surface of said corrugated paper retainer assembly via said adhesive covered top surface thereof;

and pressing said glass panel toward said support surface until it is at a predetermined desired distance therefrom, said retainer assembly being variably compressible via its crushable corrugated ply to adjust to the desired spaced distance of the glass panel with respect to the support surface panel; and applying adhesive between said glass panel and said support surface to effect permanent bonding of said glass panel to said support surface, said retainer and spacer assembly supporting said glass panel in the desired position relative to the body panel until said adhesive cures.

7. The method according to claim 6, wherein said corrugated paper retainer assembly has holes formed in said corrugated ply and said adhesive is applied into said corrugated ply and through said holes thereof.

* * * * *